(12) United States Patent
Vasey

(10) Patent No.: US 11,113,451 B2
(45) Date of Patent: Sep. 7, 2021

(54) REPRESENTATION OF MARK-UP OF MASTER DOCUMENTS

(75) Inventor: Philip E. Vasey, Southwold (GB)

(73) Assignee: Thomson Reuters Enterprise Centre GmbH

( * ) Notice: Subject to any disclaimer, the term of this patent is extended or adjusted under 35 U.S.C. 154(b) by 2019 days.

(21) Appl. No.: 11/668,686

(22) Filed: Jan. 30, 2007

(65) Prior Publication Data

US 2008/0189599 A1 Aug. 7, 2008

(51) Int. Cl.
*G06F 40/117* (2020.01)
*G06F 40/186* (2020.01)

(52) U.S. Cl.
CPC .......... *G06F 40/117* (2020.01); *G06F 40/186* (2020.01)

(58) Field of Classification Search
CPC .................................................. G06F 17/2229
USPC ........................................................ 715/277
See application file for complete search history.

(56) References Cited

U.S. PATENT DOCUMENTS

| | | | | |
|---|---|---|---|---|
| 5,267,155 A * | 11/1993 | Buchanan et al. | ............ | 715/210 |
| 5,655,130 A * | 8/1997 | Dodge | ................. | G06F 40/166 |
| | | | | 715/210 |
| 5,675,788 A * | 10/1997 | Husick | .................... | G06F 16/40 |
| 5,734,883 A * | 3/1998 | Umen | .................... | G16H 40/63 |
| 5,893,914 A * | 4/1999 | Clapp | .................. | G06F 40/174 |
| | | | | 715/205 |
| 5,903,905 A * | 5/1999 | Andersen | ................ | G06F 40/10 |
| | | | | 715/275 |
| 5,963,967 A * | 10/1999 | Umen | .................... | G06Q 10/10 |
| | | | | 715/236 |
| 6,205,455 B1 * | 3/2001 | Umen | .................... | G06Q 30/02 |
| | | | | 715/236 |
| 6,505,218 B2 * | 1/2003 | Umen | .................... | G16H 10/20 |
| | | | | 715/236 |
| 6,668,354 B1 | 12/2003 | Chen | | |
| 6,889,359 B1 | 5/2005 | Conner | | |
| 6,938,203 B1 * | 8/2005 | Dimarco et al. | .............. | 715/209 |
| 6,941,521 B2 * | 9/2005 | Lin et al. | ....................... | 715/762 |
| 7,171,618 B2 * | 1/2007 | Harrington | ........... | G06F 40/197 |
| | | | | 715/229 |
| 7,363,579 B2 * | 4/2008 | Vasey | ................... | G06F 17/218 |
| | | | | 715/256 |
| 7,380,201 B2 * | 5/2008 | Vasey | ................... | G06F 17/211 |
| | | | | 715/200 |
| 7,464,330 B2 * | 12/2008 | Bishop | .................... | G06F 9/543 |
| | | | | 715/235 |

(Continued)

FOREIGN PATENT DOCUMENTS

| | | |
|---|---|---|
| GB | 0701753.6 | 8/2007 |
| WO | WO01/04772 A2 | 1/2001 |

OTHER PUBLICATIONS

Parsons, Kimberly J. "An Authoring Tool for Customizable Documents". 1997 University of Waterloo.*

(Continued)

*Primary Examiner* — Kavita Stanley
*Assistant Examiner* — Tyler Schallhorn
(74) *Attorney, Agent, or Firm* — Anderson Gorecki LLP

(57) ABSTRACT

The present invention relates to the generation of customised documents using document templates or master documents in which a mark-up notation is used in a master document, for example to specify the content of a customised document generated from the master document.

18 Claims, 2 Drawing Sheets

(56) References Cited

U.S. PATENT DOCUMENTS

| | | | | |
|---|---|---|---|---|
| 7,472,343 | B2* | 12/2008 | Vasey | G06F 17/218 707/999.1 |
| 7,506,251 | B2* | 3/2009 | Vasey | G06F 17/211 715/209 |
| 7,617,450 | B2* | 11/2009 | Jones | G06F 40/154 715/255 |
| 7,757,160 | B2* | 7/2010 | Vasey | G06F 17/211 715/221 |
| 7,818,304 | B2* | 10/2010 | Vasey | G06F 17/2247 707/694 |
| 7,992,080 | B2* | 8/2011 | Vasey | G06F 17/243 715/204 |
| 8,234,563 | B1* | 7/2012 | Vasey | G06F 17/24 715/229 |
| 8,290,958 | B2* | 10/2012 | Boone | G06F 17/2229 707/738 |
| 8,302,003 | B2* | 10/2012 | Vasey | G06F 17/248 434/322 |
| 8,700,668 | B2* | 4/2014 | Vasey | G06F 17/248 707/793 |
| 8,745,050 | B2* | 6/2014 | Vasey | G06F 17/21 707/603 |
| 8,788,929 | B2* | 7/2014 | Vasey | G06F 17/243 715/221 |
| 9,122,667 | B2* | 9/2015 | Vasey | G06F 17/243 |
| 9,448,987 | B2* | 9/2016 | Rajkumar | G06F 40/186 |
| 9,953,021 | B2* | 4/2018 | Vasey | G06F 17/248 |
| 2001/0016842 | A1* | 8/2001 | Umen | G16H 15/00 |
| 2003/0140053 | A1* | 7/2003 | Vasey | G06F 17/243 |
| 2003/0177449 | A1 | 9/2003 | Rose | |
| 2004/0030987 | A1* | 2/2004 | Manelli | G16H 70/20 715/230 |
| 2004/0039993 | A1 | 2/2004 | Kougiouris | |
| 2004/0060005 | A1* | 3/2004 | Vasey | G06F 17/218 715/234 |
| 2004/0205656 | A1* | 10/2004 | Reulein et al. | 715/530 |
| 2004/0243551 | A1* | 12/2004 | Boone | G06F 17/2229 |
| 2005/0050078 | A1* | 3/2005 | Vasey | G06F 17/218 |
| 2005/0050444 | A1* | 3/2005 | Vasey | G06F 17/211 715/206 |
| 2005/0050445 | A1* | 3/2005 | Vasey | G06F 17/211 715/237 |
| 2005/0050464 | A1* | 3/2005 | Vasey | G06F 17/243 715/256 |
| 2005/0055332 | A1* | 3/2005 | Vasey | G06F 17/273 |
| 2005/0071755 | A1* | 3/2005 | Harrington | G06F 40/143 715/229 |
| 2005/0080808 | A1* | 4/2005 | Hailey et al. | 707/102 |
| 2005/0094207 | A1* | 5/2005 | Lo et al. | 358/1.18 |
| 2005/0149861 | A1* | 7/2005 | Bishop | G06F 9/543 715/209 |
| 2005/0160379 | A1 | 7/2005 | Roberts | |
| 2006/0031757 | A9* | 2/2006 | Vincent, III | 715/513 |
| 2006/0190816 | A1* | 8/2006 | Vasey | G06F 17/2247 715/205 |
| 2007/0011608 | A1* | 1/2007 | Titemore et al. | 715/531 |
| 2007/0050383 | A1* | 3/2007 | Vasey | G06F 17/248 |
| 2007/0061384 | A1* | 3/2007 | Harrington | G06F 40/143 |
| 2007/0089053 | A1* | 4/2007 | Uhlig et al. | 715/513 |
| 2007/0112854 | A1* | 5/2007 | Franca | 707/104.1 |
| 2007/0192355 | A1* | 8/2007 | Vasey | G06F 17/21 |
| 2007/0192688 | A1* | 8/2007 | Vasey | G06F 17/24 715/210 |
| 2007/0192760 | A1* | 8/2007 | Vasey | G06F 17/211 717/124 |
| 2007/0266328 | A1* | 11/2007 | Vasey | G06F 8/38 715/762 |
| 2008/0189599 | A1* | 8/2008 | Vasey | G06F 17/218 715/234 |
| 2011/0107204 | A1* | 5/2011 | Cohen | G09C 5/00 715/243 |
| 2014/0068422 | A1* | 3/2014 | Rajkumar | G06F 40/186 715/243 |
| 2014/0195895 | A1* | 7/2014 | Vasey | G06F 17/248 715/234 |

OTHER PUBLICATIONS

Lehtonen, Miro. "Semi-automatic document assembly with structured source data", May 31, 2002, University of Helsinki. (Year: 2001).*

Miro, Lehtonen et al. "A Dynamic User Interface for Document Assembly", Nov. 8, 2002, Association for Computing Machinery. (Year: 2002).*

* cited by examiner

REPRESENTATION OF MARK-UP OF MASTER DOCUMENTS

CROSS-REFERENCE TO RELATED APPLICATIONS

A claim of priority is made to U.S. Provisional Patent Application 60/763,224, titled Representation of Mark-up of Master Documents, filed Jan. 30, 2006, which is incorporated by reference.

FIELD OF THE INVENTION

The present invention relates to the generation of customised documents using document templates or master documents in which a mark-up notation is used in a master document, for example to specify the content of a customised document generated from the master document.

BACKGROUND OF THE INVENTION

It is known to create customised documents using document templates or master documents. In our system, customised documents are generated using master documents which contain portions of document content, such as text or images, which are selectively incorporated into the resulting customised documents. For example, portions of document content included in the master document may be included in the final customised document only if certain conditions are satisfied. Such portions of document content may be referred to as conditional document content. The master document may also include portions of document content which are included unconditionally in the final customised document.

In one example, a social services document customised to a particular person who is the subject of the document may be generated from a master document. If the subject is pregnant then the final document may need to include a portion of text relating to the pregnancy. In this case the master document contains a specific text portion relating to pregnancy which is only included in the final customised document if it has been determined that the subject is actually pregnant. The final document may also need to include a standard clause which is included regardless of pregnancy but whose wording differs depending on whether the subject is male or female. In this case, the master document contains two text portions corresponding to the alternative clause wordings. One or the other of the two text portions is selectively included in the customised document depending on whether the subject is male or female.

The information required to generate a customised document may be represented by one or more variables. In the examples given above, a first variable 'Pregnant' which can take one of the two values 'True' or 'False' is used to represent whether the subject is pregnant or not. A second variable 'Gender' which can take one of the two values 'Male' or 'Female' is used to represent the gender of the subject. In our system, the variables may also take values indicating that the value of a variable is unknown or indefinite.

The variables associated with a master document may be used to form logical statements which may in turn be used to specify the conditions which need to be satisfied for each portion of document content to be included in the customised document. For example, the logical statement Gender IS 'Female' may be formed which evaluates to True if the subject is female and evaluates to False if the subject is male. This logical statement represents the condition which must be satisfied (i.e. evaluate to True) for the standard clause relating to female subjects to be included in the customised document. The simplest logical statement is a variable such as 'Pregnant', which can take the values True and False, appearing on its own. In this case the evaluation of the logical statement is simply the value of the variable. Such a variable, 'Variable', appearing on its own as a logical statement may be considered to be shorthand for Variable IS 'True'. More complicated logical statements may also be formed by combining simpler statements using the logical operators AND, OR and NOT. For example, the logical statement (Gender IS 'Female') AND NOT(Pregnant) may be formed which evaluates to True only if the subject is female and not pregnant. The conditions (in the form of logical statements) which dictate whether particular portions of document content are included in the customised document may be referred to as usage statements.

The way in which portions of document content are incorporated into customised documents may be represented in the form of a mark-up of the master document. For example, a portion of conditional text in the master document may be indicated as such by enclosing the text in square bracket, [ . . . conditional text . . . ]. The usage statement associated with a particular portion of document content is indicated as superscript on the inside of the left-hand bracket associated with the portion of document content, [$^{Usage\ Statement}$ . . . conditional text . . . ]. The conditional document content is included in the customised document only if the usage statement associated with that conditional document content evaluates to True. For example, the mark-up [$^{Gender\ IS\ 'Male'}$ Text portion 1 . . . ] indicates that the text 'Text portion 1 . . . ' is included in the customised document only if the subject is male. Similarly, the mark-up [$^{Pregnant}$ Text portion 2 . . . ] indicates that the text 'Text portion 2 . . . ' is included in the customised document only if the subject is pregnant. In the example given above where alternative clause wordings are used depending on whether the subject is male or female, the master document contains [$^{Gender\ IS\ 'Male'}$ Clause wording 1 . . . ] [$^{Gender\ IS\ 'Female'}$ Clause wording 2 . . . ]. The position of the document content in the customised document depends on the position of the document content within the master document.

Variables such as 'Name' or 'Address' may also appear in the text portions. When a variable appears within a portion of text, the variable may be distinguished from the rest of the text by being shown between curly brackets, {variable}. One example of a conditional text portion illustrating this is [Pregnant The mother is {Name} who lives at {Address} . . . ].

In some cases, where particular predefined portions of document content, such as standard clauses need to appear in master documents, it is often more convenient to store such portions of document content in separate files. In order to insert the contents of such a file in the master document, a command may be used. For example, to insert a standard clause stored in a clause file called 'CLAUSE_FILE', the master document contains the mark-up {include CLAUSE_FILE} involving the 'include' command. Such a clause file may contain for example several conditional portions of document content representing different wordings of a standard clause, one of which is eventually chosen to appear in a customised document depending on certain factors, such as the jurisdiction involved. In another example, to insert a predefined document stored in a file called MEMO_FILE, the master document contains the mark-up {attach MEMO_FILE}. The 'attach' command may be used for example to attach portions of document content represented as a simple document not involving special mark-up. Commands such as 'include' and 'attach' may be referred to as actions.

Items such as portions of document content, variables, usage statements and commands may be referred to collectively as document elements.

Although the examples given above represents one form of mark-up, other forms of mark-up may also be used. Our U.S. patent application Ser. No. 10/434,753, incorporated herein by reference, discloses two different forms of mark-up notation and a system and method for converting a master document written in one mark-up notation to a master document written in a different mark-up notation. More complex mark-up notation may also be used. For example, our International patent applications, publication numbers WO 2005/024653, WO 2005/024654, WO 2005/024656 and WO 2005/024660, incorporated herein by reference, disclose several examples.

In order to generate a fully customised document it is necessary to determine the values of all the relevant variables so that the usage statements can be evaluated which in turn allows a determination to be made as to which of the portions of conditional document content to include in the final customised document. This information may be collected by means of a questionnaire which a user completes to assign values to the variables. In the examples given above, a user may be asked a first question inquiring as to the gender of the subject. A second question may then be asked inquiring as to whether the subject is pregnant. The questionnaire may be presented to the user in the form of a series of web pages for example in which the user types answers into text boxes or checks tick boxes corresponding to predefined alternative answers. The questionnaire may be generated automatically by analysing the master document and determining from the mark-up and the variables present which questions to ask. Our International patent applications, publication numbers WO 01/04772 and WO 03/061474, incorporated herein by reference, disclose systems and methods for generating a questionnaire from a master document.

In order to create a master document or to modify an existing master document it is necessary to have knowledge of the syntax of the mark-up used in the master document. However, the mark-up may be complex so that it is not easily understood by non-experts. This means that creation and maintenance of master documents can only be reliably carried out by mark-up experts, who may not necessarily have the appropriate expertise in the domain of the master document. In this case, two experts would be required.

We have appreciated the need for a system and method in which master documents can be created and maintained without having an expert knowledge of the syntax of the mark-up used in the master documents.

DESCRIPTION OF PREFERRED EMBODIMENTS

Figure 1:
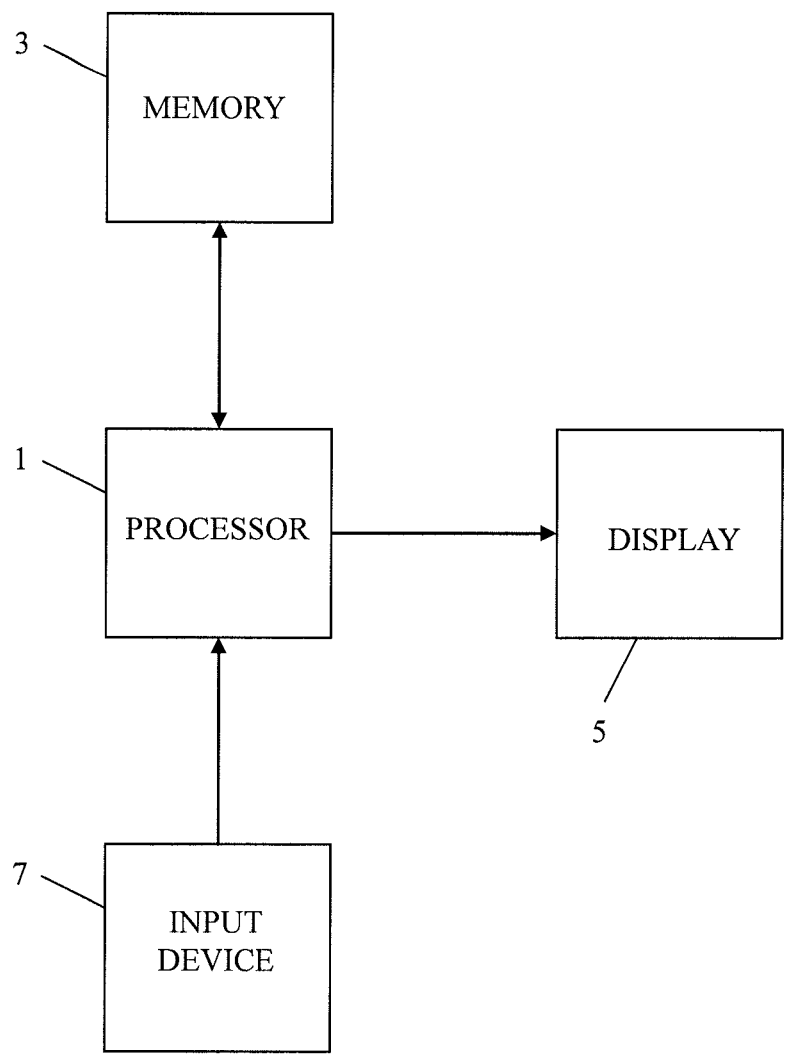
FIG. 1 is a schematic diagram of a system in which the invention may be employed.

In an embodiment of the invention, mark-up used in a master document is represented in a graphical form which is more easily understood by those not having an expert knowledge of the mark-up syntax. The graphical form and mark-up syntax may be converted from one to the other.

In one example, the graphical form is a tabular representation of the mark-up. In this case, in order to represent the mark-up used in a master document, a series of tables may be used. Some of the tables represent for example the usage statements appearing within the master document while other tables represent command mark-up used in the master document.

The tables representing the usage statement, referred to herein as usage tables, may comprise several columns, each corresponding to one of the variables used in the master document. The rows of a particular column then correspond to the different values which the variable corresponding to that column can take. The columns of a usage table may be labelled at the top of each column by specifying the variable to which the column corresponds. Each row of a particular column may be labelled by specifying the value of the variable to which the row corresponds.

In the examples given below, three variables, 'Lenders', 'Multi Currency' and 'Facility' are used. The variable 'Lenders' may take the values 'Syndicated' or 'Single Bank'. The variable 'Multi Currency' may take the values 'True' or 'False'. The variable 'Facility' may take the values 'Term Loan', 'Revolving Credit', 'Term Loan and Revolving Credit', 'Revolving Credit and Bills' or 'Swingline'.

Each individual element of a usage table (specified by a particular row and column) represents a particular variable having a specific value. Particular elements of the table may then be marked to represent usage statements involving expressions of the type Variable IS 'Value'. In order to mark individual elements of a usage table, each element comprises a 'tick box' which can be checked or unchecked. For example, the following rules may be defined to represent usage statements using usage tables.

In the simplest case, checking a single element of a usage table represents a usage statement of the form Variable IS 'Value' where the variable and the value depend on the particular element checked. For example, the usage statement Lenders IS 'Syndicated' may be represented by the following usage table.

| Lenders | | Multi Currency | Facility |
|---|---|---|---|
| Syndicated | ✓ | True | Term Loan |
| Single Bank | | False | Revolving Credit |
| | | | Term Loan and Revolving Credit |
| | | | Revolving Credit and Bills |
| | | | Swingline |

Checking a different element corresponds to a different usage statement. For example, the following usage table represents the usage statement Lenders IS 'Single Bank'.

| Lenders | | Multi Currency | Facility |
|---|---|---|---|
| Syndicated | | True | Term Loan |
| Single Bank | ✓ | False | Revolving Credit |
| | | | Term Loan and Revolving Credit |
| | | | Revolving Credit and Bills |
| | | | Swingline |

In order to represent more complex usage statements comprising simpler statements combined using the logical operators AND and OR, multiple elements in a single usage table may be checked or multiple usage tables may be used.

For example, where two or more elements in the same column have been checked, this represents a complex usage statement comprising the simpler usage statements represented by the individual checked elements (involving the same variable) acted upon by the OR operator. For example, the following usage table represents the usage statement Facility IS 'Term Loan' OR Facility IS 'Term Loan and Revolving Credit'.

| Lenders | Multi Currency | Facility | |
|---|---|---|---|
| Syndicated | True | Term Loan | ✓ |
| Single Bank | False | Revolving Credit | |
| | | Term Loan and Revolving Credit | ✓ |
| | | Revolving Credit and Bills Swingline | |

Where elements have been checked in different columns, this represents a complex usage statement comprising the simpler usage statements represented by the checked elements in each individual column acted upon by the AND operator. For example, the following usage table represents the usage statement Lender IS 'Single Bank' AND Facility IS 'Term Loan and Revolving Credit'.

| Lenders | Multi Currency | Facility | |
|---|---|---|---|
| Syndicated | True | Term Loan | |
| Single Bank ✓ | False | Revolving Credit | |
| | | Term Loan and Revolving Credit Revolving Credit and Bills Swingline | ✓ |

Using the above rules complex usage statements involving both the AND and OR operators may be represented by usage tables by checking elements in multiple rows and columns. For example, the following usage table represents the usage statement Multi Currency IS 'True' AND (Facility IS 'Term Loan' OR Facility IS 'Term Loan and revolving Credit').

| Lenders | Multi Currency | Facility | |
|---|---|---|---|
| Syndicated | True ✓ | Term Loan | ✓ |
| Single Bank | False | Revolving Credit | |
| | | Term Loan and Revolving Credit Revolving Credit and Bills Swingline | ✓ |

In order to represent complex usage statements comprising simpler usage statements (including those involving different variables) acted on by the OR operator, two usage tables may be used. The usage statement appearing on the left hand side of the OR operator is represented by the first usage table while the usage statement appearing on the right hand side of the OR operator is represented by the second usage table. The OR operator may be indicated between the two usage tables to indicate that the individual usage statements represented by the two usage tables are acted upon by that operator to form a more complex usage statement.

For example, the following pair of usage tables represent the usage statement Multi Currency IS 'True' OR Facility IS 'Swingline'.

| Lenders | Multi Currency | | Facility |
|---|---|---|---|
| Syndicated | True | ✓ | Term Loan |
| Single Bank | False | | Revolving Credit |
| | | | Term Loan and Revolving Credit |
| | | | Revolving Credit and Bills |
| | | | Swingline |

OR

| Lenders | Multi Currency | Facility | |
|---|---|---|---|
| Syndicated | True | Term Loan | |
| Single Bank | False | Revolving Credit | |
| | | Term Loan and Revolving Credit | |
| | | Revolving Credit and Bills | |
| | | Swingline | ✓ |

In another example, the following pair of usage tables represent the usage statement (Multi Currency IS 'True' AND Facility IS 'Term Loan') OR (Multi Currency IS 'True' AND Facility IS 'Swingline').

| Lenders | Multi Currency | | Facility | |
|---|---|---|---|---|
| Syndicated | True | ✓ | Term Loan | ✓ |
| Single Bank | False | | Revolving Credit | |
| | | | Term Loan and Revolving Credit Revolving Credit and Bills Swingline | |

OR

| Lenders | Multi Currency | | Facility | |
|---|---|---|---|---|
| Syndicated | True | ✓ | Term Loan | |
| Single Bank | False | | Revolving Credit | |
| | | | Term Loan and Revolving Credit Revolving Credit and Bills Swingline | ✓ |

In order to represent the logical operator NOT, a different means to check elements of usage tables may be used. For example, whereas checking an element with a tick represents the usage statement Variable IS 'Value', checking the same element with a cross may be used to represent the complimentary usage statement NOT(Variable IS 'Value'). For example, the following usage table represents the usage statement NOT(Facility IS 'Term Loan').

| Lenders | Multi Currency | Facility | |
|---|---|---|---|
| Syndicated | True | Term Loan | x |
| Single Bank | False | Revolving Credit | |
| | | Term Loan and Revolving Credit | |
| | | Revolving Credit and Bills | |
| | | Swingline | |

Checking multiple elements using crosses may be used in an analogous way as with ticks. Combinations of ticks and crosses may also be used. For example, the following usage table represents the usage statement Lenders IS 'Syndicated' AND NOT(Facility IS 'Swingline').

| Lenders | | Multi Currency | Facility | |
|---|---|---|---|---|
| Syndicated | ✓ | True | Term Loan | |
| Single Bank | | False | Revolving Credit | |
| | | | Term Loan and Revolving | |
| | | | Credit Revolving Credit | |
| | | | and Bills Swingline | x |

The examples given above use usage tables to represent mark-up specifying usage statements. Other forms of table may be used to represent other forms of mark-up. For example, another form of table, referred to herein as command tables, may be used to represent mark-up involving commands.

A command table comprise two columns, the first specifying the type of command represented by the command table and the second specifying a command operand such as the name of a file used by the command. The command table comprises one or more rows, each row corresponding to a different command. For example, the mark-up {include PREPAY_SYNDICATED_CLAUSE}, involving the 'include' command, may be represented by the following command table.

| include | PREPAY_SYNDICATED_CLAUSE |
|---|---|

In another example involving the multiple commands 'include' and 'attach', the mark-up {include REVOLVER_WITH_TERM_CLAUSE} {attach MEMO_213} may be represented by the following command table.

| include | PREPAY_SYNDICATED_CLAUSE |
|---|---|
| attach | MEMO_213 |

The tabular representation described above may also be used to represent mark-up in which elements of the master document occur within the scope of usage statements. For example, when a command appears within the scope of a usage statement, represented by the mark-up [$^{Usage\ Statement}$ Command], this may be represented in tabular form by visually associating the usage tables representing the usage statement with the command table representing the command. In this example, the command table may be displayed above the usage table and the tables may be associated with each other by including the keyword 'when' between the two tables. The 'when' keyword indicates that the command represented by the command table is carried out when the usage statement represented by the usage table evaluates to true.

For example, the mark-up [$^{Lenders\ IS\ 'Syndicated'}$ {include PREPAY_SYNDICATED_CLAUSE}] may be represented by the following tables.

| include | PREPAY_SYNDICATED_CLAUSE |
|---|---|

WHEN

| Lenders | | Multi Currency | Facility |
|---|---|---|---|
| Syndicated | ✓ | True | Term Loan |
| Single Bank | | False | Revolving Credit |
| | | | Term Loan and Revolving Credit |
| | | | Revolving Credit and Bills |
| | | | Swingline |

In some cases, it may be convenient to define a variable in a master document in terms of a usage statement. For example, it may be convenient to use a defined variable 'Single Bank with Revolving Term Loan' to represent the usage statement Lenders IS 'Single Bank' AND Facility IS 'Term Loan and Revolving Credit'. This may be the case for example when standard clauses are inserted into master documents using the include command. The standard clauses specified in clause files may comprise conditional text controlled by generic variables, referred to as usage tags. The usage tags then need to be specifically defined in each master document depending on how each master document wishes to use the clause.

In such cases, a 'define' command may be used for example using the mark-up {define Single Bank with Revolving Term, Lenders IS 'Single Bank' AND Facility IS 'Term Loan and Revolving Credit' }. This mark-up may be represented by the following tables.

| define | Single Bank with Revolving Term |
|---|---|

WHEN

| Lenders | | Multi Currency | Facility | |
|---|---|---|---|---|
| Syndicated | | True | Term Loan | |
| Single Bank | ✓ | False | Revolving Credit | |
| | | | Term Loan and Revolving | ✓ |
| | | | Credit Revolving Credit | |
| | | | and Bills Swingline | |

It is understood that the tabular representation of mark-up described above is only one example of a graphical representation of mark-up used in master documents and that other forms of graphical representation could also be used.

Figure 2:
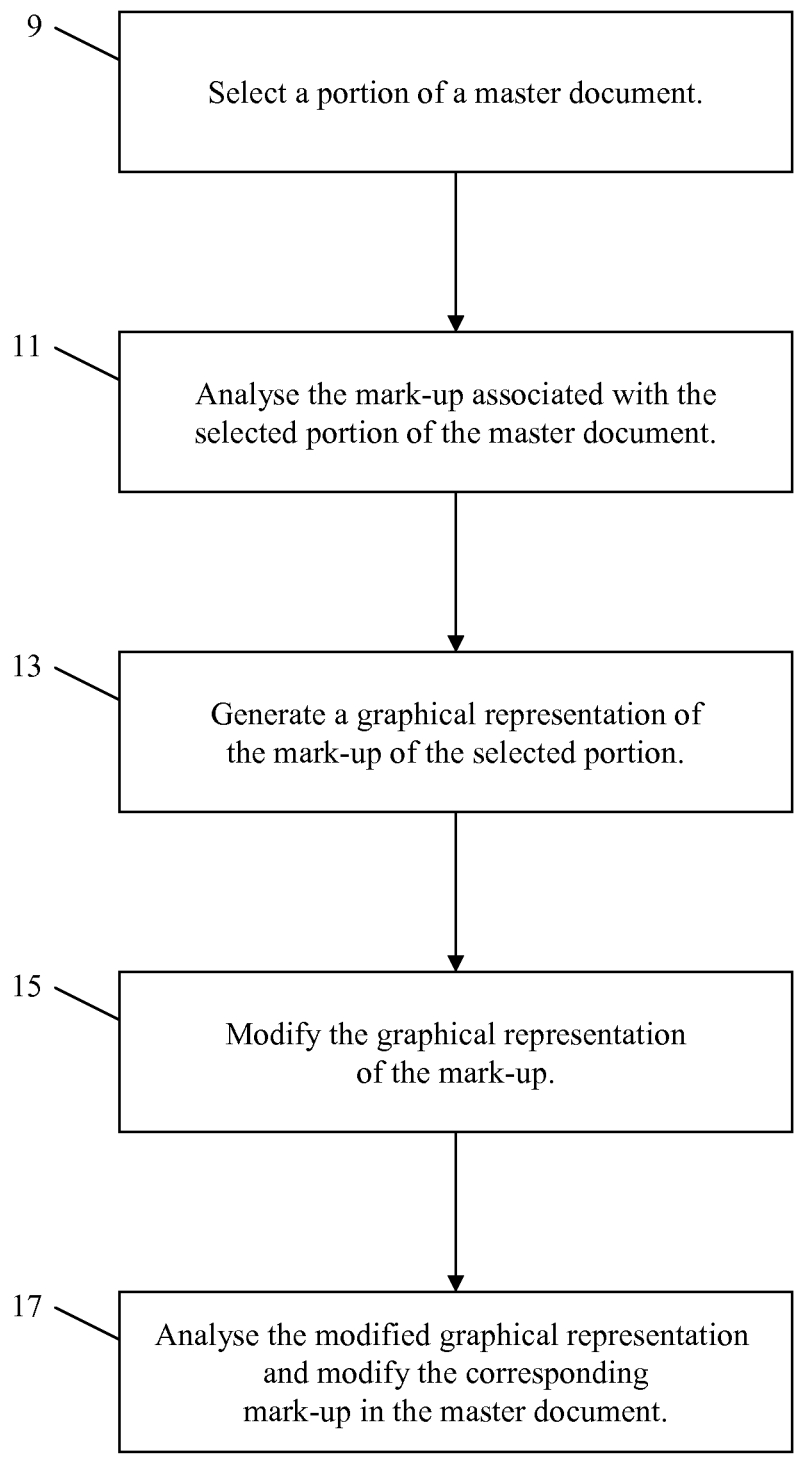
FIG. 2 is a flow chart of a method according to the invention.

A master document may be modified or maintained by a person not having an expert knowledge of the syntax of the mark-up used in the master document using the method described below and illustrated in FIG. 2. The method may be carried out by a user on any suitable system. One suitable computer system, illustrated in FIG. 1, comprises a processor 1, a memory 3, a display 5 such as a VDU, and one or more input devices 7 such as a keyboard and mouse. The memory 3 is arranged to store various data used in the system, and computer executable code which is executed by the processor 1 to perform various method steps and other processes. The display 5 is used to present a user interface and any other visual information to a user. The input devices 7 may be used to input information into the system.

A master document stored as a file may be stored and retrieved using any suitable file storage and retrieval system. The user retrieves a master document to be modified which is then presented to the user on the user interface. The master document contains various portions of document content, some of which may be marked-up according to a predetermined syntax. In a first step 9, using an input device 7 such as a mouse, the user is able to select a portion of the master document. In a next step 11, the processor 1 analyses the mark-up associated with the selection. In a next step 13 the processor generates a graphical representation of the mark-up, for example a tabular representation according to the rules described above. For example, if the user has selected a portion of the master document consisting of a command contained within the scope of a usage statement, the system generates and displays on the display 5 the corresponding command table and usage statement tables. Since this representation is easier to understand than the mark-up, the user can understand the mark-up without having an expert knowledge of the mark-up syntax.

In a next step 15, using the input devices 7, the user may then modify the tables. For example, the user may check particular elements of the usage tables and uncheck other elements by clicking in the appropriate usage table elements. This will have the effect of modifying the usage statement represented by the usage tables. The user may also modify the command table, for example by modifying the type of command or file name specified in the command table. This will have the effect of modifying the command appearing in the master document. One advantage of the tabular representation of mark-up described above is that the user is able to see some or all of the available variables and some or all of the values which may be assigned to the variables in contrast with the corresponding mark-up which only shows the variables and values actually used. This facilitates the selection of appropriate variables and values when the user modifies the master document. In another embodiment, rather than displaying multiple variables and values in the usage tables, only those elements of the usage tables actually checked are displayed. This may be desirable for example if the user does not wish to modify the mark-up of the master document but rather simply wishes to view the mark-up in graphical form.

The user may be allowed to delete one or more of the tables. For example, the user may select one or more of the usage tables and then select a 'delete' icon. This would have the effect of making those elements of the master document that occurred within the scope of the usage statement represented by the deleted tables unconditional. The user may also be allowed to create new tables, including usage tables, for example to make a previously unconditional portion of the master document conditional. In this case, the user selects a portion of the master document and then clicks a 'create usage table' icon. The user may then edit the created usage table to define the usage statement that controls the selected portion of the master document.

Once the user has finished modifying the tables, the user may select a 'finish' icon. This causes the processor 1, in a next step 17, to analyse the modified tables and to modify the corresponding mark-up in the master document. The modified master document may be presented to the user on the user interface for inspection, for example with the modified portions highlighted in some way.

If it is desired to generate a customised document from the master document, the user selects a 'generate customised document' icon. This causes the system to generate a questionnaire from the customised document from the master document and to display the questionnaire to the user for input of information.

The questionnaire may be in the form of a web page created using HTML for example. The questionnaire may be completed by inputting various information in response to a series of questions presented on the display 5. The user may input information using the input devices 7 for example by typing text into text boxes, by selecting buttons corresponding to different options and so on. The user may also navigate forwards and backwards through the questionnaire amending their answers to the questions. In some embodiments, the questionnaire web page may be accessed independently from several computers connected together by a network. This allows different users to complete different parts of the questionnaire more easily. In some embodiments, the information required to answer some questions may be provided from an external database or other information source.

Once the user has completed the questionnaire, a customised document may be generated using the information collected in the questionnaire.

A master document used in the system may be implemented for example in the form of a Microsoft Word document which contains various portions of document content such as text and in which the mark-up of the master document is represented by the formatting features of Microsoft Word, such as superscript.

The invention claimed is:

1. A method comprising:
displaying a master document of a document generation system, the master document comprising unconditional content, conditional content, and non- graphical mark-up which evaluates based on input to determine whether the conditional content is included in a customized document generated from the master document by the document generation system;
selecting a portion of the unconditional content of the master document;
causing the selected portion of the unconditional content to become selected conditional content in the master document by generating and displaying a graphical representation of how the non-graphical mark-up is related to the selected conditional content in the master document, including conditions under which the selected conditional content is included in the customized document; and
responsive to modification of the displayed graphical representation, modifying the non-graphical mark-up in the master document correspondingly, thereby modifying how the non-graphical mark-up is related to the selected conditional content in the master document.

2. The method of claim 1 in which the displayed graphical representation of the non-graphical mark-up comprises a tabular representation.

3. The method of claim 1 in which the non-graphical mark-up comprises a rule associated with the selected conditional content, the rule specifying the conditions under which the selected conditional content is selected for inclusion in the customized document.

4. The method of claim 3 in which the rule comprises a logical statement involving at least one variable.

5. The method of claim 4 in which the displayed graphical representation comprises a table having one or more elements, each element representing a logical statement in which a variable is equated to a value, and in which one or more of the elements are checked.

6. The method of claim 5 in which, if an element is checked in a first manner, the table represents a usage statement consisting of the logical statement corresponding to the checked element.

7. The method of claim 5 in which, if an element is checked in a second manner, the table represents the usage statement consisting of the complement of the logical statement corresponding to the checked element.

8. The method of claim 5 in which, if two elements corresponding to the same variable are checked, the table represents a usage statement formed, at least partially, by operating on two logical statements corresponding to the two checked elements with the OR operator.

9. The method of claim 5 in which, if two elements corresponding to different variables are checked, the table represents a usage statement formed, at least partially, by operating on two logical statements corresponding to the two checked elements with the AND operator.

10. The method of claim 5 in which the displayed graphical representation comprises two or more tables and in which the tables represent a usage statement formed by operating on the usage statements represented by each individual table with one or more logical operators.

11. The method of claim 3 in which the selected conditional content is visually associated with the displayed graphical representation of the rule.

12. The method of claim 1 in which the displayed graphical representation comprises a table having a first set of elements specifying one or more commands and a second set of elements specifying one or more command operands.

13. A non-transitory computer program product having software recorded thereon which, when executed by a computer, causes the computer to undertake the method of claim 1.

14. A method comprising:
displaying a master document of a document generation system, the master document comprising unconditional content, conditional content, and non-graphical mark-up which evaluates based on input to determine whether the conditional content is included in a customized document generated from the master document by the document generation system;
selecting a portion of the master document comprising associated conditional content;
analyzing the non-graphical mark-up associated with the selected portion of the master document;
generating and displaying a graphical representation of how the non- graphical mark-up is related to the associated conditional content, including conditions under which the associated conditional content is included in the customized document;
modifying the displayed graphical representation of the mark-up responsive to input;
modifying the non-graphical mark-up of the master document in response to the modification of the graphical representation, thereby modifying how the non- graphical mark-up is related to associated conditional content in the master document; and
responsive to deletion of the displayed graphical representation of the mark- up, causing the associated conditional content to become unconditional content in the master document.

15. The method of claim 14 in which the step of modifying the graphical representation of the mark-up includes the step of modifying the graphical representation of the mark-up in response to a user input.

16. An apparatus comprising:
means for displaying a master document of a document generation system, the master document comprising unconditional content, conditional content, and non-graphical mark-up which evaluates based on input to determine whether the conditional content is included in a customized document generated from the master document;
means for selecting a portion of the unconditional content of the master document;
means for causing the selected portion of the unconditional content to become selected conditional content in the master document;
means for generating and displaying a graphical representation of how the non-graphical mark-up is related to the selected conditional content in the master document, including conditions under which the selected conditional content is included in the customized document;
means, responsive to modification of the displayed graphical representation, for modifying the non-graphical mark-up in the master document correspondingly, thereby modifying how the non-graphical mark-up is related to the selected conditional content in the master document; and
means, responsive to deletion of the displayed graphical representation, for causing the selected conditional content to become unconditional content in the master document.

17. The document generation system of claim 16 further comprising means to modify the graphical representation of the mark-up.

18. The document generation system of claim 17 in which the means to modify the graphical representation of the mark-up comprises means to allow a user to modify the graphical representation of the mark-up, and means responsive to modification of the graphical representation of the mark-up to modify the non-graphical mark-up.

* * * * *